US009927228B2

(12) United States Patent
Cho et al.

(10) Patent No.: US 9,927,228 B2
(45) Date of Patent: Mar. 27, 2018

(54) METHOD OF DETECTING ULTRAVIOLET RAY AND ELECTRONIC DEVICE THEREOF

(71) Applicant: Samsung Electronics Co., Ltd., Gyeonggi-do (KR)

(72) Inventors: Jeong-Ho Cho, Gyeonggi-do (KR); Seung-Geol Baek, Gyeonggi-do (KR); Ki-Hun Eom, Gyeonggi-do (KR); Dong-Han Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 183 days.

(21) Appl. No.: 14/829,214

(22) Filed: Aug. 18, 2015

(65) Prior Publication Data
US 2016/0048954 A1 Feb. 18, 2016

(30) Foreign Application Priority Data

Aug. 18, 2014 (KR) ........................ 10-2014-0107178

(51) Int. Cl.
| | |
|---|---|
| *H04N 7/18* | (2006.01) |
| *G01B 11/26* | (2006.01) |
| *G01J 1/42* | (2006.01) |
| *H04N 5/232* | (2006.01) |
| *G01J 1/02* | (2006.01) |

(52) U.S. Cl.
CPC ............ *G01B 11/26* (2013.01); *G01J 1/0219* (2013.01); *G01J 1/0233* (2013.01); *G01J 1/0242* (2013.01); *G01J 1/429* (2013.01); *G01J 1/4228* (2013.01); *H04N 5/23293* (2013.01); *G01J 2001/4266* (2013.01)

(58) Field of Classification Search
CPC ....................................................... G01J 1/429
See application file for complete search history.

(56) References Cited

U.S. PATENT DOCUMENTS

| | | | |
|---|---|---|---|
| 5,036,311 A | 7/1991 | Moran et al. | |
| 9,470,577 B2* | 10/2016 | Lian ....................... | G01J 1/0403 |
| 2002/0071185 A1* | 6/2002 | Chretien .................. | G02B 5/20 |
| | | | 359/629 |
| 2002/0115926 A1* | 8/2002 | Takada .................. | A61B 5/0059 |
| | | | 600/407 |
| 2004/0188617 A1* | 9/2004 | Devitt ....................... | G01J 1/04 |
| | | | 250/338.1 |

(Continued)

FOREIGN PATENT DOCUMENTS

| | | |
|---|---|---|
| CN | 1779424 | 5/2006 |
| CN | 2789854 | 6/2006 |

(Continued)

OTHER PUBLICATIONS

Chinese Office Action dated Dec. 25, 2017 issued in counterpart application No. 201510507432.6, 10 pages.

*Primary Examiner* — Chikaodili E Anyikire
(74) *Attorney, Agent, or Firm* — The Farrell Law Firm, P.C.

(57) ABSTRACT

A method is provided for operating an electronic device. The method includes detecting an ultraviolet ray value through an ultraviolet ray detection sensor; acquiring an image including a sun object; comparing a position of the sun object within the acquired image to a position of a guide object; and correcting the detected ultraviolet ray value based on a difference between the position of the sun object and the position of the guide object.

14 Claims, 21 Drawing Sheets

(56) References Cited

U.S. PATENT DOCUMENTS

| | | | |
|---|---|---|---|
| 2004/0189820 A1* | 9/2004 | Yagi | H04N 9/735 |
| | | | 348/223.1 |
| 2005/0236576 A1 | 10/2005 | Yagl | |
| 2008/0017784 A1* | 1/2008 | Hoot | G01S 3/7861 |
| | | | 250/203.4 |
| 2011/0222375 A1* | 9/2011 | Tsubata | G01J 1/02 |
| | | | 368/11 |
| 2014/0303885 A1* | 10/2014 | Kamada | G01C 21/3461 |
| | | | 701/400 |
| 2016/0048954 A1* | 2/2016 | Cho | G01J 1/429 |
| | | | 348/135 |

FOREIGN PATENT DOCUMENTS

| | | |
|---|---|---|
| CN | 101825490 | 9/2010 |
| KR | 10-1358089 | 1/2014 |

\* cited by examiner

METHOD OF DETECTING ULTRAVIOLET RAY AND ELECTRONIC DEVICE THEREOF

PRIORITY

This application claims priority under 35 U.S.C. § 119(a) to Korean Patent Application Serial No. 10-2014-0107178, which was filed in the Korean Intellectual Property Office on Aug. 18, 2014, the entire content of which is incorporated herein by reference.

BACKGROUND

1. Field of the Invention

The present invention relates generally to an electronic device and method for detecting an ultraviolet ray.

2. Description of the Related Art

Because excessive exposure to ultraviolet rays can be harmful, people often want to limit their exposure to ultraviolet rays and interest in an ultraviolet index has increased. For example, a user may measure an ultraviolet ray value from the sun by using an electronic device including an ultraviolet ray detection sensor (a UV sensor). The electronic device may detect an ultraviolet ray value based on a measured quantity of light in an ultraviolet band (for example, 280 nm to 400 nm) and provide the detected ultraviolet ray value to the user.

Generally, to measure ultraviolet rays from the sun using an electronic device including a UV sensor, a user aims the electronic device toward the sun and then measures the ultraviolet rays with the electronic device. However, this type of measurement method is often inaccurate since it may be difficult to properly aim the sensor toward the sun.

Further, although some devices attempt to correct errors in an ultraviolet ray value, the corrected ultraviolet ray values are only conjectured values, based on an equation, which does not necessarily guarantee accuracy.

SUMMARY

The present invention has been made to address at least the above-mentioned problems and/or disadvantages and to provide at least the advantages described below.

Accordingly, an aspect of the present invention is to provide an electronic device and method for matching an incident angle of the sun and a viewing angle of an ultraviolet ray detection sensor.

Another aspect of the present invention is to provide an electronic device and method for displaying radial images on a display screen and guiding a user, such that a photographed sun image overlaps the radial images.

Another aspect of the present invention is to provide an electronic device and method for compensating an ultraviolet ray detection value according to a position of the sun image displayed on a display.

In accordance with an aspect of the present invention, a method of operating an electronic device is provided. The method includes detecting an ultraviolet ray value through an ultraviolet ray detection sensor; acquiring an image including a sun object; comparing a position of the sun object within the acquired image to a position of a guide object; and correcting the detected ultraviolet ray value based on a difference between the position of the sun object and the position of the guide object.

In accordance with an aspect of the present invention, an electronic device is provided. The electronic device includes an ultraviolet ray detection sensor for detecting an ultraviolet ray value; an image sensor for acquiring an image including a sun object; a display for displaying the image including the sun object; and a processor for comparing a position of the sun object within the acquired image to a position of a preset guide object, and correcting the detected ultraviolet ray value based on a difference between the position of the sun object and the position of the guide object.

In accordance with another aspect of the present invention, a method of operating an electronic device is provided. The method includes displaying a first object on a display; capturing a sun object; overlapping the sun object with the first object; and detecting an ultraviolet ray value through an ultraviolet ray detection sensor based on a difference between a position of the first object and a position of the sun object.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
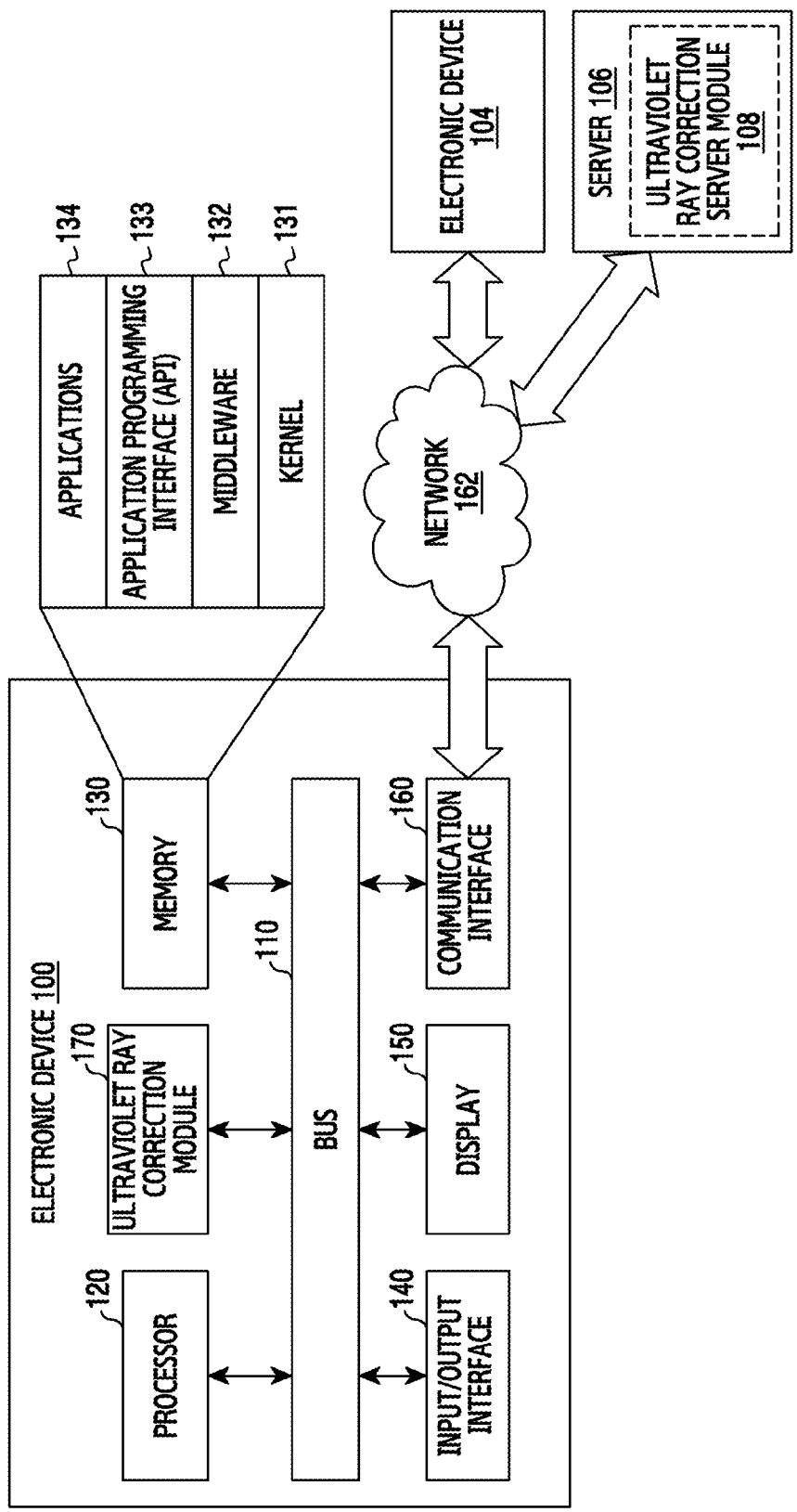
FIG. 1 illustrates an electronic device according to an embodiment of the present invention.

Hereinafter, various embodiments of the present invention will be described with reference to the accompanying drawings. The present invention may be modified in various forms and include various embodiments, but specific examples are illustrated in the drawings and described in the description. However, the description is not intended to limit the present invention to the specific embodiments described herein, and it shall be appreciated by a person having ordinary skill in the art that all the changes, equivalents and substitutions belonging to the idea and technical scope of the present invention are included in the present invention.

In the description of the drawings, identical or similar reference numerals are used to designate identical or similar elements.

Herein, the terms "include" or "may include" refer to the existence of a corresponding disclosed function, operation, or component that can be used in various embodiments of the present invention and does not limit one or more additional functions, operations, or components. Similarly, terms such as "include" or "have" may be construed to denote a certain characteristic, number, step, operation, constituent element, component, or a combination thereof, but may not be construed to exclude the existence of or a possibility of addition of one or more other characteristics, numbers, steps, operations, constituent elements, components, or combinations thereof.

The term "module" used herein may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter.

The expressions "or" or "at least one of A or/and B" include any or all of combinations of words listed together. For example, the expression "A or B" or "at least A or/and B" may include A, may include B, or may include both A and B.

Herein, the expressions "1", "2", "first", or "second" may modify various components of various embodiments, but does not limit the corresponding components. For example, the above expressions do not limit the sequence and/or importance of the elements but are used merely to distinguish an element from another element. For example, a first electronic device and a second electronic device indicate different electronic devices, although both of them are electronic devices. For example, without departing from the scope of the present invention, a first component element may also be referred to as a second component element. Similarly, the second component element may also be referred to as the first component element.

When an element is referred to as being "connected to" or "accessed by" other elements, it should be understood that the element may be directly connected to or accessed by the other elements, or also another element may exist between them. However, when an element is referred to as being "directly connected to" or "directly accessed by" other elements, it should be understood that there is no element therebetween.

As used herein, singular forms are intended to include the plural forms as well, unless the context clearly indicates otherwise.

Unless defined differently, all terms used herein, which include technical terminologies or scientific terminologies, have the same meanings as known to a person skilled in the art to which the present disclosure belongs. Such terms as those defined in a generally used dictionary are to be interpreted to have meanings consistent to the contextual meanings in the relevant field of art, and are not to be interpreted to have ideal or excessively formal meanings, unless clearly defined as such in the present disclosure.

An electronic device according to various embodiments of the present invention may include a device with a communication function. For example, the electronic device may be at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and or a smart watch), etc.

The electronic device may also be a smart home appliance with a communication function, such as a television (TV), a Digital Video Disk (DVD) player, an audio player, a refrigerator, an air conditioner, a vacuum cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, or an electronic picture frame.

The electronic device may also be at least one of various types of medical devices, such as a Magnetic Resonance Angiography (MRA) device, Magnetic Resonance Imaging (MRI) device, Computed Tomography (CT) device, a scanning machine, ultrasonic wave device, etc.

The electronic device may also be at least one of a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics equipment, a security device, or an industrial or home robot.

The electronic device may also be at least one of furniture or a part of a building/structure having a communication function, electronic boards, electronic signature receiving devices, projectors, or various measuring equipment (e.g., a water meter, an electricity meter, a gas meter, or a radio wave meter).

Also, the electronic device may be a flexible device.

Additionally, the electronic device may be a combination of one or more of above described various devices.

However, the electronic device is not limited to the above-described devices.

Herein, the term "user" may refer to a person who uses an electronic device or a device (for example, an artificial intelligence electronic device) that uses an electronic device.

Herein, 'a viewing angle of an ultraviolet ray detection sensor' is defined as a perpendicular direction from the surface of the ultraviolet ray detection sensor (or the direction that the ultraviolet ray detection sensor is aimed). 'An incident angle of a sun' is defined as an angle between a sun ray and the surface of an ultraviolet ray detection sensor. Accordingly, when the incident angle of the sun matches the viewing angle of the ultraviolet ray detection sensor, this scenario may be referred to as "an angle between the sun and the ultraviolet ray detection sensor is about 0 degrees". Similarly, when the incident angle of the sun crosses the viewing angle of the ultraviolet ray detection sensor by about x degrees, this scenario may be referred to as "an angle between the sun and the ultraviolet ray detection sensor is about x degree".

Herein, "a guide object" refers to a displayed object for visually representing a viewing angle of an ultraviolet ray detection sensor on a display (or representing the direction that the ultraviolet detection sensor is aimed). The center of the guide object corresponds to the perpendicular direction from the surface of the ultraviolet detection sensor (or the direction that the ultraviolet detection sensor is aimed). That is, when the center of the sun in the photographed image matches the center of the guide object, the incident angle of the sun matches the viewing angle of the ultraviolet ray detection sensor.

FIG. 1 illustrates an electronic device according to an embodiment of the present invention.

Referring to FIG. 1, the electronic device 100 includes a bus 110, a processor 120, a memory 130, an input/output interface 140, a display 150, a communication interface 160, and an ultraviolet ray correction module 170. Alternatively, the ultraviolet ray correction module 170 may be included in the processor 120.

The bus 110 may be a circuit that interconnects the other components, i.e., the processor 120, the memory 130, the input/output interface 140, the display 150, the communication interface 160, and the ultraviolet ray correction module 170, and delivers communications (for example, a control message) between the other components.

The processor 120 receives a command from the other components, through the bus 110, decrypts the received command, and executes an operation or data processing based on the decrypted command.

The memory 130 stores commands or data received from the other components, or generated by the other components.

The memory 130 includes programming modules, for example, a kernel 131, middleware 132, an Application Programming Interface (API) 133, and an application 134. Each of the aforementioned programming modules may be formed of software, firmware, hardware, or a combination of at least two thereof.

The kernel 131 may control or manage system resources, for example, the bus 110, the processor 120, and the memory 130 to execute an operation or function implemented in the other programming modules. The kernel 131 may also provide an interface for the middleware 132, the API 133, or the applications 134 to access an individual component of the electronic device 100, e.g., for control or management.

The middleware 132 may operate as a relay for the API 133 or the applications 134 to exchange data with the kernel 131. Also, in association with operation requests received from the applications 134, the middleware 132 may execute a control, for example, scheduling or load balancing, for an operation request, for example, by assigning, to at least one of the applications 134, a priority of use of a system resource of the electronic device 100, such as the bus 110, the processor 120, the memory 130, etc.

The API 133 is an interface used by the applications 134 to control a function provided from the kernel 131 or the middleware 132, and may include at least one interface or function for a file control, a window control, image processing, a character control, etc.

The applications 134 may include a Short Message Service (SMS)/Multimedia Message Service (MMS) application, an e-mail application, a calendar application, an alarm application, a health care application (for example, an application for measuring a work rate or blood sugar), an environment information application (for example, an application for providing atmospheric pressure, humidity, or temperature information). The applications 134 may also include an application for exchanging information between the electronic device 100 and an external electronic device (for example, an electronic device 104). The application for exchanging information may include a notification relay application for transferring predetermined information to an external electronic device or a device management application for managing an external electronic device.

For example, the notification relay application may transfer, to the electronic device 104, notification information generated from other applications of the electronic device 100, e.g., an SMS/MMS application, an e-mail application, a health management application, an environmental information application, etc.

The notification relay application may receive notification information from an external electronic device (for example, the electronic device 104), and provide the notification information to a user.

For example, the device management application may install, delete, update, etc., a function for an external electronic device (for example, the electronic device 104) communicating with the electronic device 100. For example, the device management application may turn on/off the electronic device 104 or some component thereof, or adjust luminance or a resolution of a display of the electronic device 104. Further, the device management application may operate applications operating in the external electronic device, or services provided by the external electronic device (for example, a call service or a message service).

The applications 134 may include an application designated based on properties of an external electronic device. For example, when the electronic device 104 is an MP3 player, the application 134 may include an application related to the reproduction of music. Similarly, when the electronic device 104 is a mobile medical device, the application 134 may include an application related to health care.

The applications 134 may also include an application designated in the electronic device 100 and an application received from the external electronic device (for example, a server 106 or the electronic device 104).

The input/output interface 140 transfers a command or data input by a user through an input/output device (for example, a sensor, a keyboard, a touch screen, a button, etc.) to the other components, through the bus 110. For example, the input/output interface 140 may provide the processor 120 with data associated with a touch user input through a touch screen.

Further, the input/output interface 140 may output, for example, a command or data received through the bus 110 from the other components, to an input/output device (e.g., a speaker or a display). For example, the input/output interface 140 may output voice data processed by the processor 120 to the user through a speaker.

The display 150 may display various information, such as multimedia data, text data, etc.

The communication interface 160 connects the electronic device 100 and another device (for example, the electronic device 104 or the server 106). For example, the communication interface 160 may be connected to a network 162 through wireless or wired communication, and may communicate with an external device through the network 162. The wireless communication may include at least one of Wi-Fi, Bluetooth (BT), Near Field Communication (NFC), Global Positioning System (GPS) or and cellular communication, such as Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc. Examples of the wired communication include a Universal Serial Bus (USB), a High Definition Multimedia Interface (HDMI), a Recommended Standard 232 (RS-232), or and a Plain Old Telephone Service (POTS).

The network 162 may be a communication network, such as a telecommunication network including at least one of a computer network, Internet, Internet of things, and/or a telephone network.

A protocol for communication between the electronic device 100 and the external device (for example, a transport lay protocol, data link layer protocol, or a physical layer protocol) may be supported by at least one of the applications 134, the application programming interface 133, the middleware 132, the kernel 131, and the communication interface 160.

The ultraviolet ray correction module 170 detects an ultraviolet ray value from the sun, defines (or sets) a position of the sun (a sun image or a sun object, i.e., a displayed object representing the position of the sun) in a photographed image, and compares the position of the sun in the photographed image with a predetermined guide object, in order to correct an ultraviolet ray detection value. For example, the guide object may be an ultraviolet ray sensing value for correcting an ultraviolet ray value.

The ultraviolet ray correction module 170 may determine the position of the sun in the photographed image using x and y coordinates and determine which part of the guide object includes the determined position of the sun. Thereafter, the ultraviolet ray correction module 170 may correct the ultraviolet ray detection value according to the part of the guide object that includes the position of the sun.

The server 106 may support driving of an electronic device 100 by conducting operations (or functions) implemented by the electronic device 100. For example, the server 106 includes an ultraviolet ray correction server module 108 that supports the ultraviolet ray correction module 170 implemented by the electronic device 100. The ultraviolet ray correction server module 108 may include one or more components of the ultraviolet ray correction module 170 to perform (on behalf of the ultraviolet ray correction module 170) at least one of the operations of the ultraviolet ray correction module 170.

The ultraviolet ray correction module 170 may process at least some of information acquired from the other components and may provide processed information to a user in various schemes. For example, the ultraviolet ray correction module 170 may control at least some functions of the electronic device 100 by using the processor 120, or independently therefrom, to control the electronic device 100 to interwork with other electronic devices (for example, the electronic device 104 or the server 106).

Alternatively, the ultraviolet ray correction module 170 (or a portion thereof) may be included in the server 106 (for example, the ultraviolet ray correction server module 108) and receive support for at least one operation implemented by the ultraviolet ray correction module 170 from the server 106.

Figure 2:
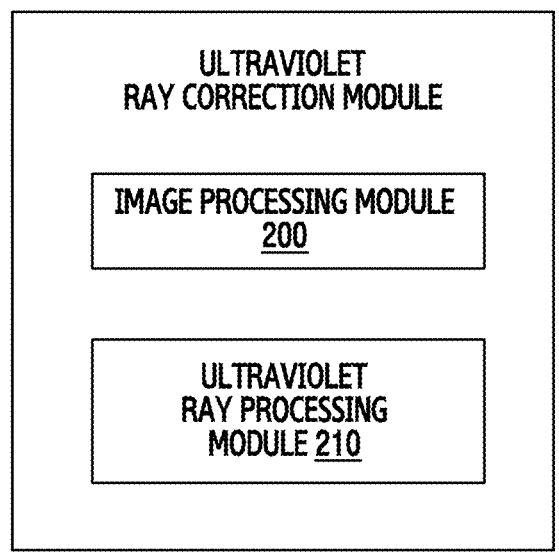
FIG. 2 illustrates an ultraviolet correction module according to an embodiment of the present invention.

FIG. 2 illustrates an ultraviolet ray correction module according to an embodiment of the present disclosure. For example, the ultraviolet ray correction module illustrated in FIG. 2 may be used as ultraviolet ray correction module 170 in FIG. 1.

Referring to FIG. 2, the ultraviolet ray correction module includes an image processing module 200 and an ultraviolet ray processing module 210. Alternatively, the image processing module 200 and the ultraviolet ray processing module 210 may be implemented together as a single module in the ultraviolet ray correction module.

The image processing module 200 photographs (or captures) the sun and displays the photographed sun image on a preview screen. The image processing module 200 detects a position of the sun (sun object) by analyzing image buffer (or frame buffer) information determined by an image sensor. Specifically, the image processing module 200 measures an angle between the sun and the electronic device using the image sensor. The image processing module 200 then detects whether an incident angle of the sun matches a viewing angle of an ultraviolet ray detection sensor of the electronic device or how much the two angles differ.

The image processing module 200 may display a radial image (guide object) in a camera photographing mode or an ultraviolet ray measuring mode. The radial image may be used for guiding a sun image to detect an ultraviolet ray. For example, the radial image may include a straight line, a curved line, a figure, and/or a character image.

FIGS. 8A, 8B, 8C, and 8D illustrate screen configurations for detecting ultraviolet rays according to an embodiment of the present invention.

Figure 8A:
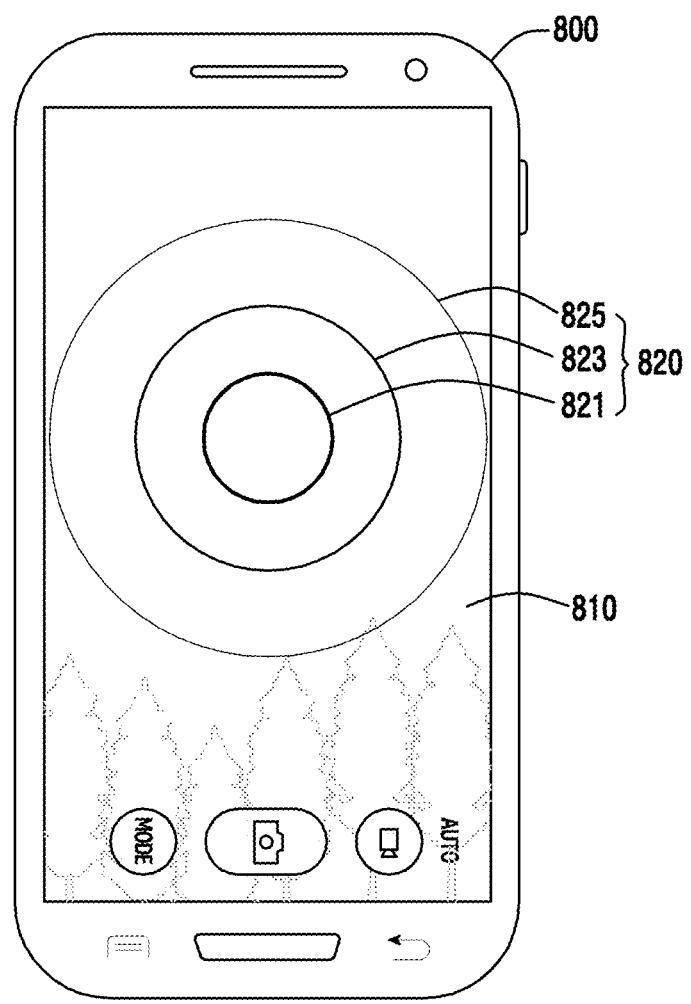
FIGS. 8A, 8B, 8C, and 8D illustrate screen configurations for detecting ultraviolet rays according to an embodiment of the present invention.

Referring to FIG. 8A, the image processing module 200 displays radial images 820 on a preview screen 810. The radial images 820 include a plurality of circles 821, 823, and 825 that overlap each other. The circles 821, 823, and 825 may have different sizes and colors. Although FIG. 8A, illustrates the radial images 820 as circles, the present invention is not limited thereto, and the radial images 820 may have various shapes.

The circles 821, 823, and 825 of the radial images 820 indicate angles between the sun and an ultraviolet ray detection sensor of the electronic device 800. For example, when the photographed sun image (sun object) is located at the center of the first circle 821, the angle between the sun and the ultraviolet ray detection sensor is about 0 degrees. In this case, when an ultraviolet ray is detected, the electronic device 800 acquires an accurate ultraviolet ray detection value.

However, when the photographed sun image extends over the first circle 821, the angle between the sun and the ultraviolet ray detection sensor are about 10 degrees. Similarly, when the photographed sun image extends over the second circle 823, the angle between the sun and the ultraviolet ray detection sensor are about 20 degrees. Basically, when the sun image gradually moves outward from the first circle 821, the angle between the sun and the ultraviolet ray detection sensor gradually increases. Although the circles 821, 823, and 825 illustrated in FIG. 8A are described as indicating the angles between the sun and the ultraviolet ray detection sensor at intervals of 10 degrees, the present invention is not limited thereto and various angle intervals may be applied.

Figure 8B:
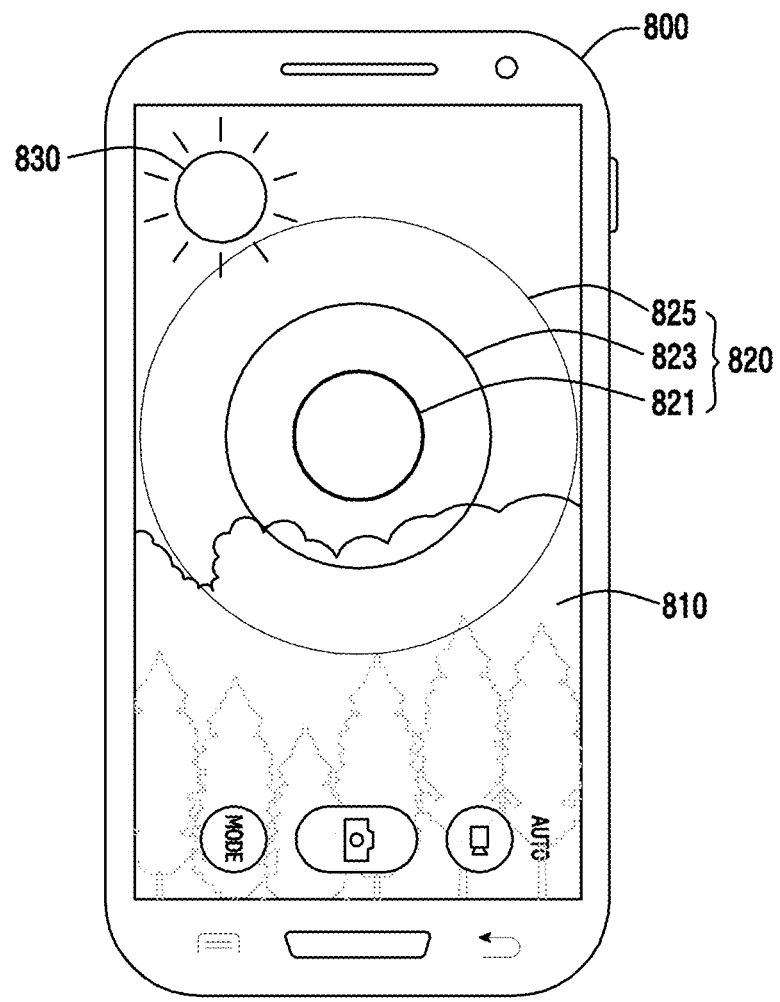

Referring to FIG. 8B, the image processing module 200 may display a photographed sun object 830 on the preview screen 810. For example, the image processing module 200 sets a resolution of the preview screen 810 to be low. The user views the sun object 830 through the preview screen 810, and controls a position of the sun object 830 on the preview screen 810 by changing a position of the electronic device 800.

By the user changing the position of the electronic device 800, the ultraviolet ray processing module 210 may correct the ultraviolet ray detection value based on the display position of the sun object 830 processed by the image processing module 200.

The ultraviolet ray processing module 210 measures an ultraviolet ray value through the ultraviolet ray detection sensor installed in a front surface or a rear surface. For example, the ultraviolet ray detection sensor may measure an amount of light in an ultraviolet band (280 nm to 400 nm), which is invisible to the naked eye. Further, the ultraviolet ray detection sensor may have a filter, which is designed to transmit only the light in the ultraviolet band. The ultraviolet ray detection sensor may be integrally implemented with an image sensor or separately therefrom.

The ultraviolet ray processing module 210 may guide the user to move the electronic device 800 until the displayed sun object 830 overlaps the radial image (or guide object). For example, the ultraviolet ray processing module 210 may guide the user to make the sun object 830 be positioned in the center of the radial image to detect the ultraviolet ray.

Figure 8C:
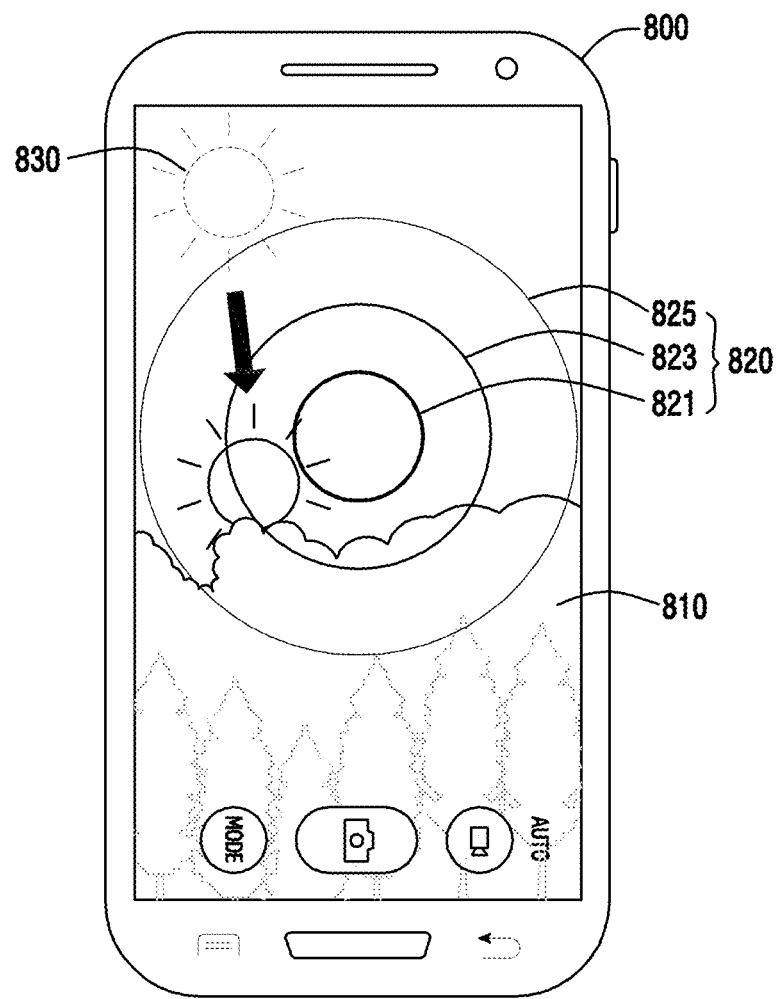

Referring to FIG. 8C, the ultraviolet ray processing module 210 guides the user to make the sun object 830 overlap the radial images 820. For example, the ultraviolet ray processing module 210 may output a notification sound or a notice and guide the user to move the sun object 830 to the center of the radial images 820. As another example, the ultraviolet ray processing module 210 may output a notification sound or a notice and guide the user to make the sun object 830 merely be located within the radial images 820.

However, the present invention is not limited to the examples illustrated in FIGS. 8A to 8C, and the ultraviolet ray processing module 210 may guide the user to control a position of the sun object 830 through various other methods.

Figure 3:
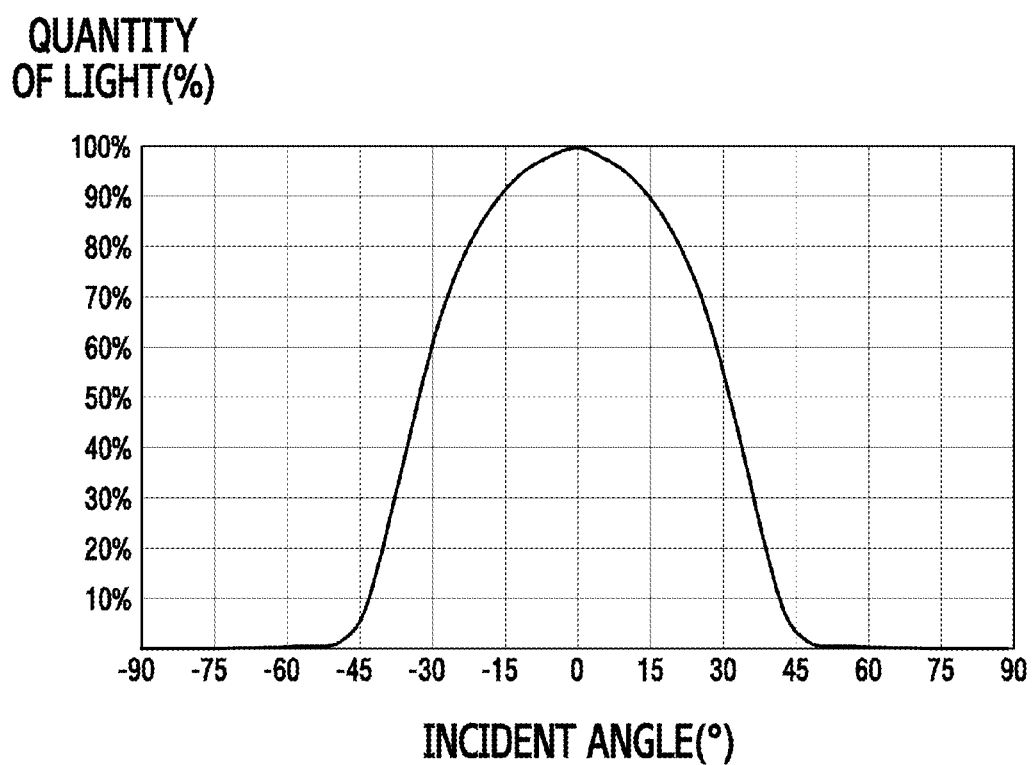
FIG. 3 is a normalization graph illustrates a change in a quantity of light of an ultraviolet ray detection sensor based on an incident angle of the sun, according to an embodiment of the present invention.

FIG. 3 is a normalization graph illustrating a change in a quantity of light of an ultraviolet ray detection sensor based on an incident angle of the sun, according to an embodiment of the present invention.

Referring to FIG. 3, as the incident angle of the ultraviolet ray detection sensor from the sun moves closer to 0 degrees, the quantity of light of the sun becomes closer to a maximum value (for example, about 100%). However, when the incident angle of the ultraviolet ray detection sensor from the sun gradually diverts away from 0 degrees, the quantity of light of the sun gradually decreases. For example, when the angle between the sun and the ultraviolet ray detection sensor is diverted by about 15 degrees (i.e., when the incident angle of the ultraviolet ray detection sensor from the sun is about 15 degrees), the quantity of light of the sun decreases by about 10%. Based on such a method, when measuring an ultraviolet ray, the ultraviolet ray processing module 210 may pre-calculate an angle between the sun and the ultraviolet ray detection sensor and then correct an ultraviolet ray detection value by a reduced quantity of light of the sun based on the corresponding angle. For example, the ultraviolet ray processing module 210 may correct an ultraviolet ray detection value according to a display position of the sun image that overlaps the radial image.

For example, referring again to FIG. 8C, when the sun object 830 extends over the second circle 823 of the radial images 820, the ultraviolet ray processing module 210 may determine that an angle between the ultraviolet ray detection sensor and the sun is about 20 degrees, and then perform compensation by multiplying the actual detected ultraviolet ray value by about 1.15 to correct a reduced quantity of light (for example, about 15%) due to the corresponding angle (for example, about 20 degrees). As the sun object 830 extends over one of the circles 821, 823, and 825 of the radial images 820, the ultraviolet ray processing module 210 may perform different corrections based on the reduced quantity of light according to the corresponding angle.

As described above, the ultraviolet ray processing module 210 may output a corrected ultraviolet ray value. For example, the ultraviolet ray processing module 210 may output a signal or an Analog-Digital Converter (ADC) conversion value as the corrected ultraviolet ray value. The ultraviolet ray processing module 210 may convert the ultraviolet ray correction value into an ultraviolet index and output the converted value.

Figure 8D:
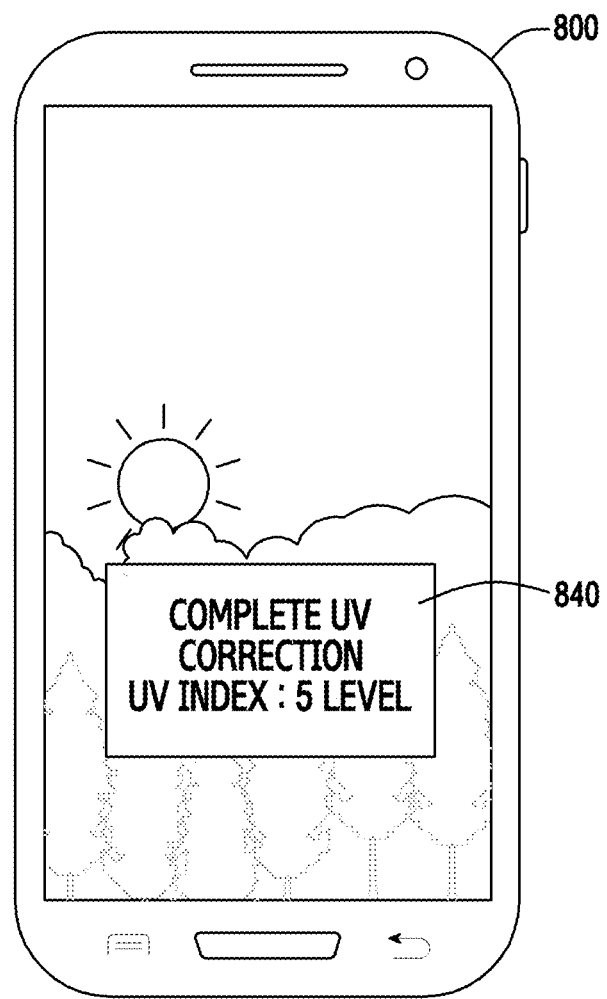

Referring to FIG. 8D, when the ultraviolet ray correction is completed, the ultraviolet ray processing module 210 displays ultraviolet index information 840 as the ultraviolet ray correction value. For example, the ultraviolet ray processing module 210 may output the ultraviolet index information 840 through a notification sound. Additionally, when the ultraviolet index is larger than a reference index, the ultraviolet ray processing module 210 may give the user a warning or an alarm through the notification sound or a notice.

Figure 4:
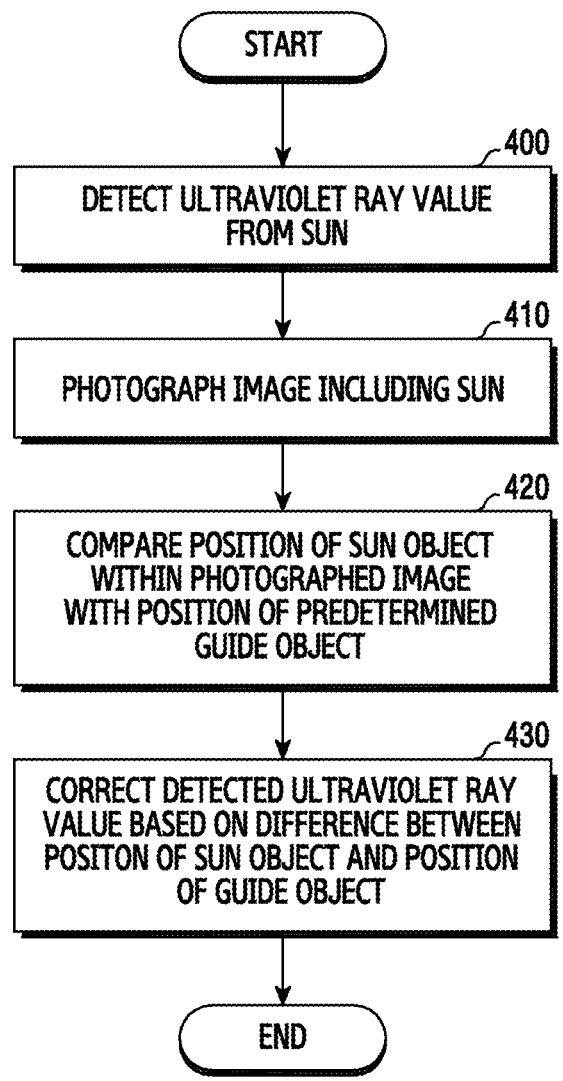
FIG. 4 is a flowchart illustrating an ultraviolet ray detection method according to an embodiment of the present invention.

FIG. 4 is a flowchart illustrating an ultraviolet ray detection method according to an embodiment of the present invention.

Referring to FIG. 4, an electronic device (for example, the electronic device 100) determines an ultraviolet ray value from the sun in step 400. For example, the electronic device may measure an ultraviolet ray value from the sun using an ultraviolet ray detection sensor installed in a front surface or a rear surface.

In step 410, the electronic device photographs an image including the sun. For example, the electronic device may photograph an image including the sun using the ultraviolet ray detection sensor. The electronic device may photograph the sun in a camera photographing mode and in an ultraviolet ray measuring mode. The ultraviolet ray measuring mode may be a mode for measuring an ultraviolet ray from the sun through the ultraviolet ray detection sensor. Preferably, the image sensor is designed to not be damaged when photographing the sun.

The electronic device may photograph the image including the sun while a preview screen is displayed.

According to an embodiment, the electronic device may capture or photograph the sun when the guide object is not displayed in a camera photographing mode or an ultraviolet ray measuring mode.

For example, the electronic device may photograph the sun image while a guide object is displayed in a camera photographing mode or an ultraviolet ray measuring mode. The guide object may be predetermined, and may be expressed as a radial image for guiding a sun object to correct an ultraviolet value. However, the present invention is not limited thereto, and the guide object may include other indications, such as at least one of a straight line and a curved line. Further, the guide object may include a figure or a character image.

FIGS. 6A, 6B, 6C, and 6D illustrate screen configurations for detecting ultraviolet rays according to an embodiment of the present invention.

Figure 6A:
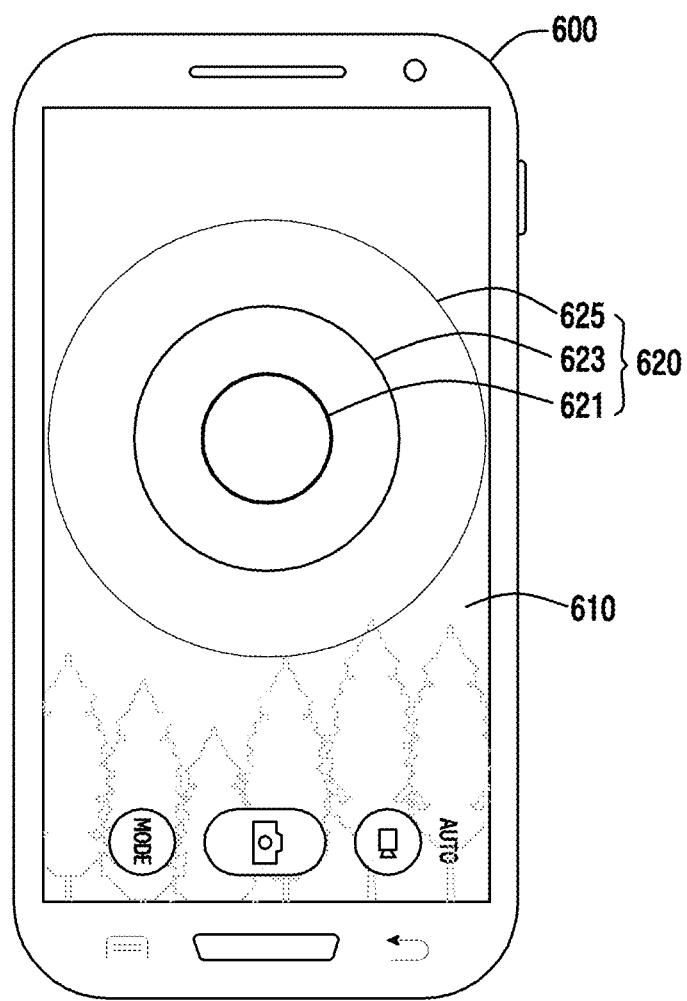
FIGS. 6A, 6B, 6C, and 6D illustrate screen configurations for detecting ultraviolet rays according to an embodiment of the present invention.

Referring to FIG. 6A, an electronic device 600 displays radial images 620 on a preview screen 610. The radial images 620 include a plurality of circles 621, 623, and 625. The circles 621, 623, and 625 may have different sizes and colors.

Similar to the description of FIGS. 8A to 8D above, the circles 621, 623, and 625 of the radial images 620 indicate angle intervals between the sun and an ultraviolet ray detection sensor of the electronic device 600. For example, when the photographed sun image is located at the center of the first circle 621, the angle between the sun and the ultraviolet ray detection sensor is about 0 degrees. In this case, when an ultraviolet ray is detected, the electronic device 600 acquires an accurate ultraviolet ray detection value. However, when the photographed sun image extends over the first circle 621, the angle between the sun and the ultraviolet ray detection sensor is about 10 degrees. Similarly, when the photographed sun image extends over the second circle 623, the angle between the sun and the ultraviolet ray detection sensor is about 20 degrees. Again, as the sun image gradually moves outward from the first circle 621, the angle between the sun and the ultraviolet ray detection sensor gradually increases.

Although the circles 621, 623, and 625 indicate the angles between the sun and the ultraviolet ray detection sensor at intervals of 10 degrees, the present invention is not limited thereto and various angle intervals may be applied.

Figure 6B:
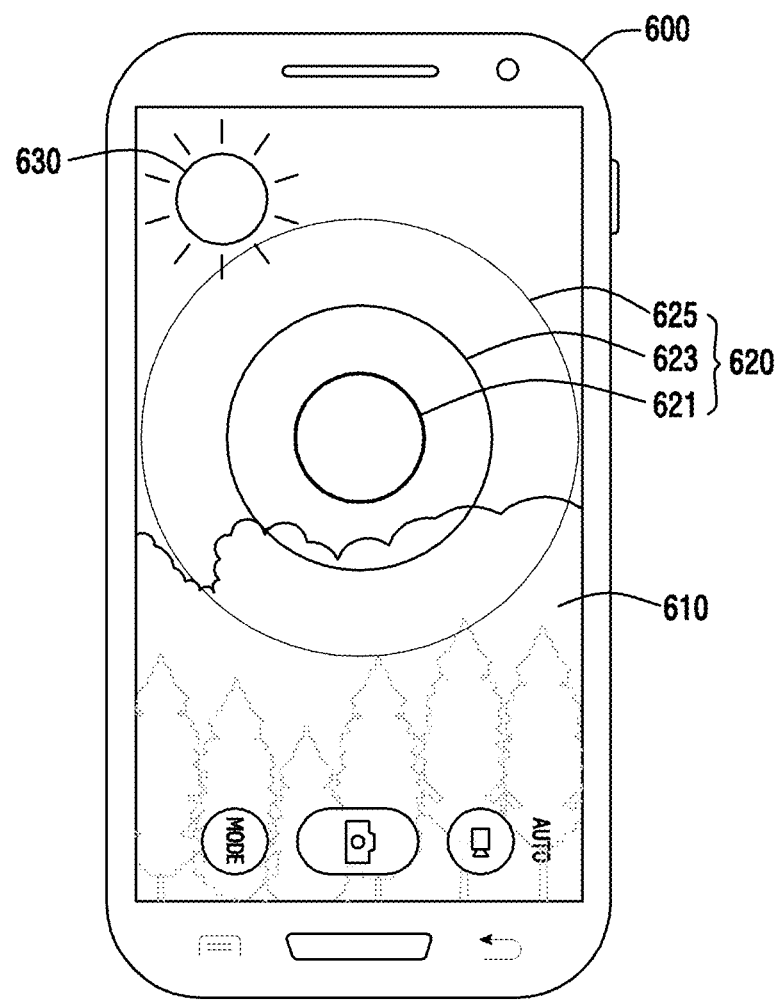

Referring to FIG. 6B, the electronic device 600 displays the photographed sun object 630 while the radial images 620 are displayed on the preview screen 610. The user may identify a position of the sun object 630 through the preview screen 610, and control a position of the sun object 630 on the preview screen 610 by changing a position of the electronic device 600. When the sun object 630 within the photographed image is identified by the user's eyes, the user may be dazzled, so that the electronic device 600 displays the sun object 630 using a metaphor method and may be replaced with an alternative image.

Figure 6C:
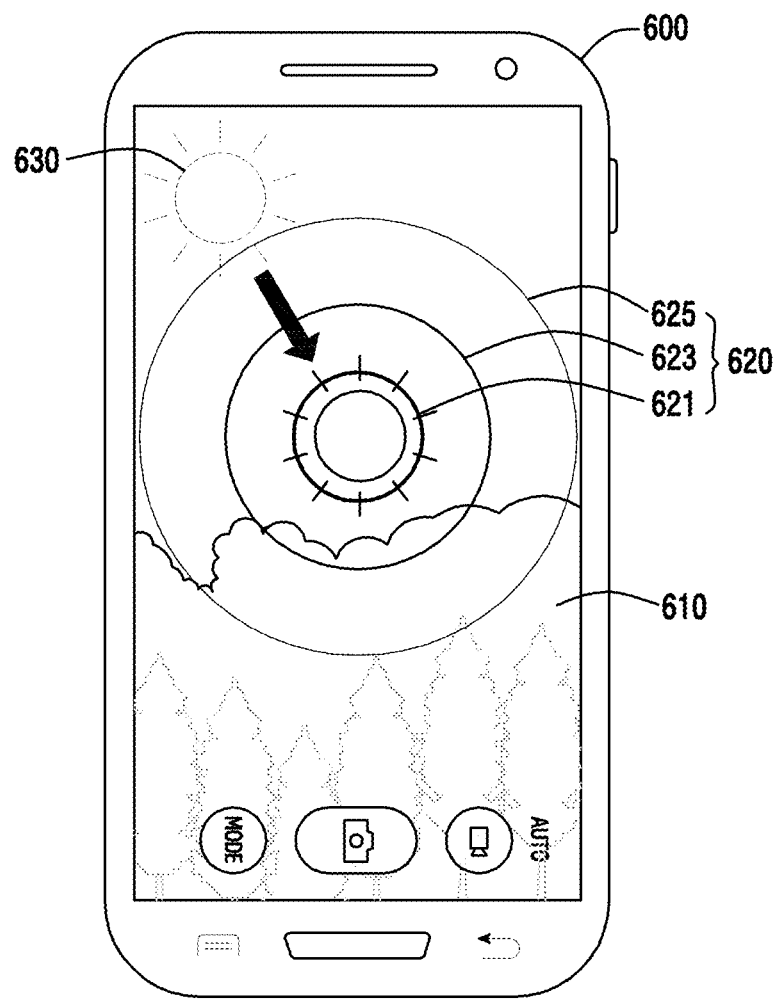

Referring to FIG. 6C, the electronic device 600 guides the user to move the electronic device 600, such that the sun object 630 overlaps the radial images 620. For example, the electronic device 600 may output a notification sound or a notice and guide the user to move the sun object 630 to the center of the radial images 620 or to merely be located within the radial images 620.

When guiding the user to make the sun object 630 overlap the radial images 620, if the sun object 630 is located within the radial images 620 with a predetermined overlapping rate, the electronic device 600 may inform the user of the overlapping rate.

According to an embodiment, an angle between the sun object 630 and the ultraviolet sensor may be displayed on the preview screen 610. The angle may be displayed continuously or intermittently (when a predetermined event happens). When the angle is displayed intermittently, the angle may be displayed on the preview screen each time the sun object 630 overlaps the circles 621, 623, and 625 (for example, at 10°, 20°, and 30°).

Referring again to FIG. 4, in step 420, the electronic device compares the position of the sun object within the photographed image with a position of a predetermined guide object. The electronic device may defines (or sets) the position of the sun object within the photographed image. For example, an image processor of the electronic device may determine the position of the sun using x and y coordinates, and may determine which part of the radial image includes the determined coordinate value of the sun.

The electronic device may detect a distance between the center of the sun object of the photographed image and the center of the guide object.

In step 430, the electronic device corrects a detected ultraviolet ray value based on a difference between the position of the sun object and the position of the guide object.

Referring again to FIG. 6C, when the sun object 630 extends over the second circle 623 of the radial images 620, the electronic device 600 may determine that an angle between the ultraviolet ray detection sensor and the sun is about 20 degrees, and then performs a correction (or a compensation) by multiplying a detected ultraviolet ray value by about 1.15 to account for a reduced quantity of light (for example, about 15%) due to the corresponding angle (for example, about 20 degrees).

When the sun object 630 extends over one of the circles 621, 623, and 625 of the radial images 620, the electronic device 600 may perform different corrections based on the reduced quantity of light according to the corresponding angle.

As described above, the electronic device may output the corrected ultraviolet ray value. For example, the electronic device may output a signal or an ADC conversion value as the corrected ultraviolet ray value. The electronic device may convert the ultraviolet ray correction value into an ultraviolet index and output the ultraviolet index. For example, the electronic device may display a user message (for example, refrain from going out) based on the converted ultraviolet index. The electronic device may display the ultraviolet ray value on the screen immediately when the ultraviolet ray value is detected by an ultraviolet ray sensor.

Figure 6D:
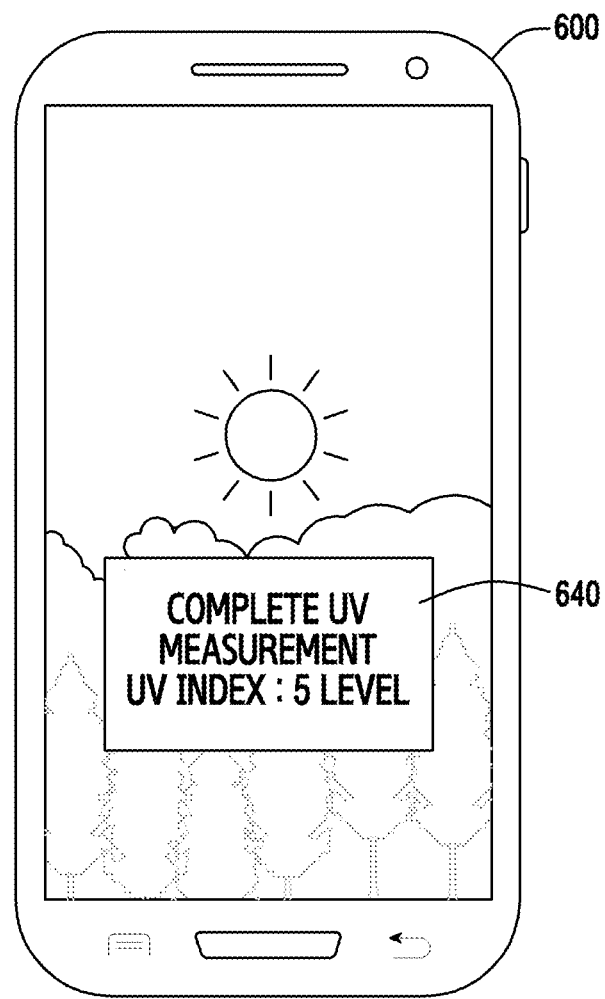

Referring to FIG. 6D, when the ultraviolet ray correction is completed, the electronic device 600 displays ultraviolet index information 640 as the ultraviolet ray correction value. For example, the electronic device 600 may output the ultraviolet index information 640 through a sound notification. When the ultraviolet index is larger than a reference index, the electronic device 600 may give the user a warning or an alarm through the notification sound or a notice. For example, when the ultraviolet index is larger than the reference index, the electronic device 600 may display a user message such as "refrain from going out".

Figure 5:
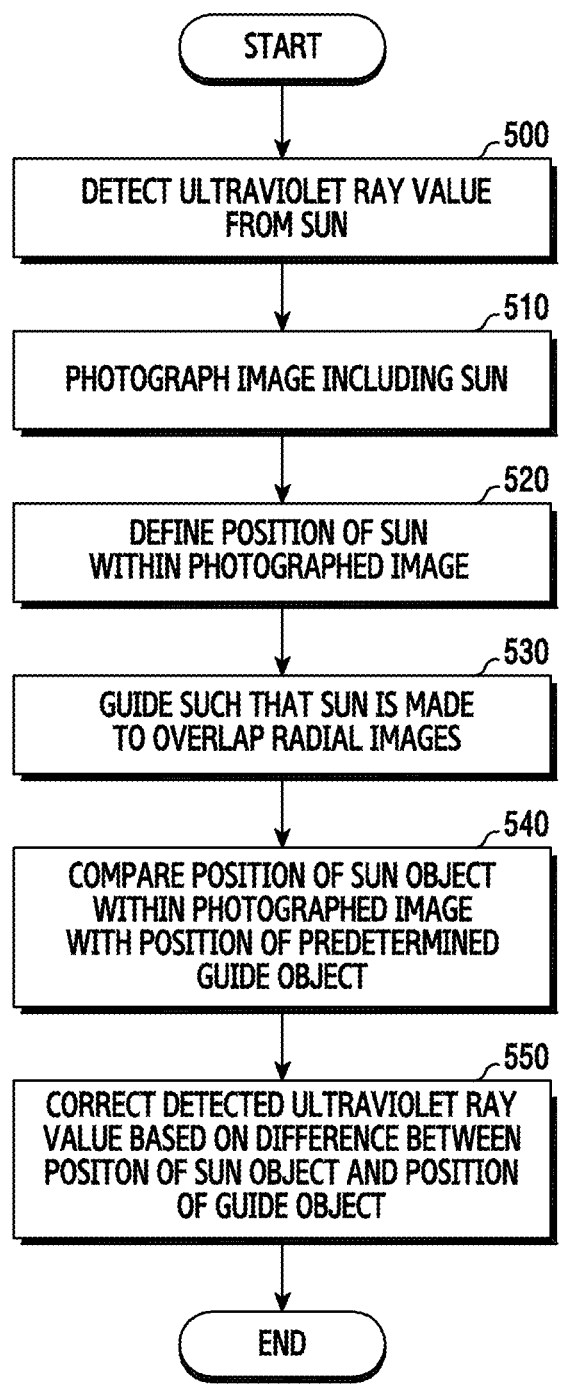
FIG. 5 is a flowchart illustrating an ultraviolet ray detection method according to an embodiment of the present invention.

FIG. 5 is a flowchart illustrating an ultraviolet ray detection method according to an embodiment of the present invention.

Referring to FIG. 5, an electronic device (for example, the electronic device 100) determines an ultraviolet ray value from the sun in step 500. For example, the electronic device may measure an ultraviolet ray value from the sun using an ultraviolet ray detection sensor installed in a front surface or a rear surface.

In step 510, the electronic device photographs an image including the sun.

Notably, steps 500 and 510 of FIG. 5 are the same as steps 400 and 410 of FIG. 4. Therefore, a redundant explanation of these steps will be omitted herein.

In step 520, the electronic device defines a position of the sun in the photographed image. For example, an image processor of the electronic device may determine the position of the sun using x and y coordinates, and may determine which part of the radial image includes the determined coordinate value of the sun. The electronic device may detect a distance between the center of the sun object of the photographed image and the center of the guide object to determine the position of the sun.

In step 530, the electronic device guides the user to make the sun object overlap the radial images. For example, the electronic device guides the user to move the electronic device, such that the sun object is moved to the center of the radial images to detect an ultraviolet ray. For example, as illustrated in FIG. 6C, the electronic device 600 may guide the user to move the electronic device 600, such that the sun object 630 overlap the radial images 620, as described above.

According to an embodiment of the present invention, an angle between the sun object 630 and the ultraviolet sensor may be displayed on the preview screen 610. The angle may be displayed continuously or intermittently (when a predetermined event happens). When the angle is displayed intermittently, the angle may be displayed on the preview screen each time the sun object 630 overlaps the circles 621, 623, and 625 (for example, at 10°, 20°, and 30°).

In step 540, the electronic device compares the position of the sun object within the photographed image with a position of a predetermined guide object, and in step 550, the electronic device corrects a detected ultraviolet ray value based on a difference between the position of the sun object and the position of the guide object. Because steps 540 and 550 of FIG. 5 are the same as steps 420 and 430 of FIG. 4, a redundant explanation of these steps will be omitted herein.

Figure 7:
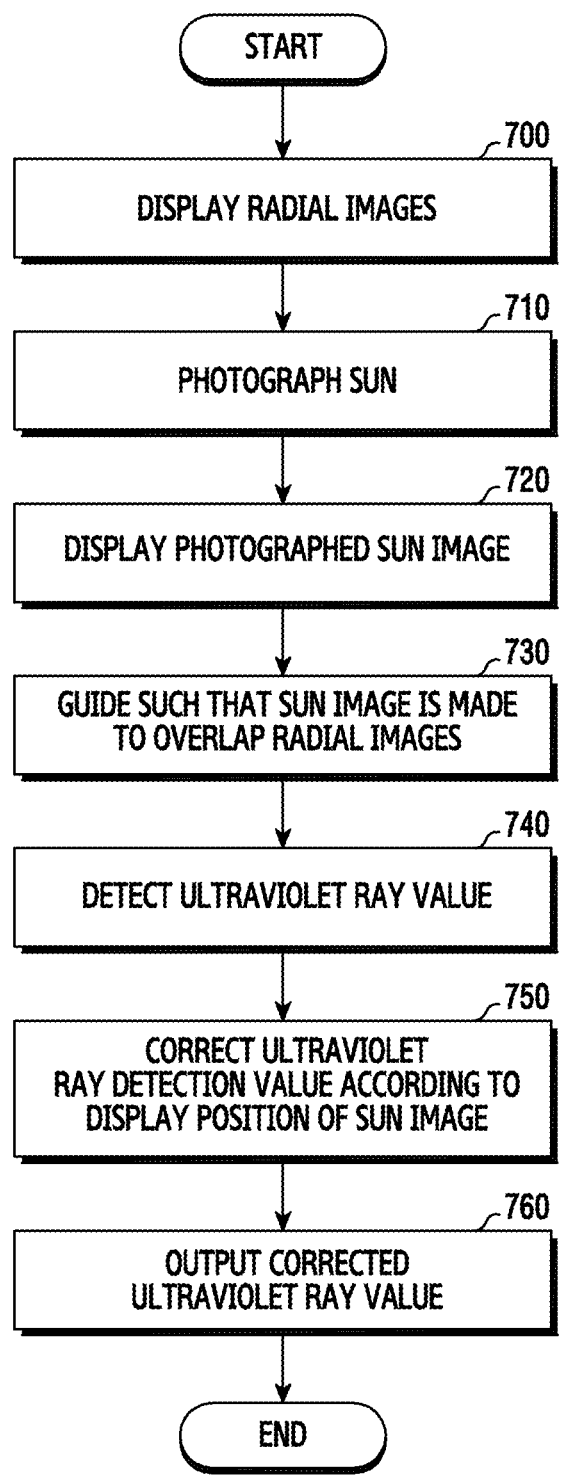
FIG. 7 is a flowchart illustrating an ultraviolet ray detection method according to an embodiment of the present invention.

FIG. 7 is a flowchart illustrating an ultraviolet ray detection method according to an embodiment of the present invention.

Referring to FIG. 7, an electronic device (for example, the electronic device 100) displays radial images in step 700, for example, a plurality of circles 821, 823, and 825 as illustrated in FIG. 8A, as described above.

In step 710, the electronic device photographs the sun. For example, the electronic device may photograph the sun through an image sensor installed in a front surface or a rear surface.

In step 720, the electronic device displays the photographed sun object 830, for example, as illustrated in FIG. 8B, as described above.

In step 730, the electronic device guides the user to make the sun object 830 overlap the radial images (or guide object) 820, for example, as illustrated in FIG. 8C, as described above In step 740, the electronic device detects an ultraviolet ray value, e.g., using an ultraviolet ray detection sensor installed in a front surface or a rear surface of the electronic device.

In step 750, the electronic device corrects the ultraviolet ray detection value based on a difference between a position of sun object 830 and a position of guide object 820.

For example, the electronic device may correct the ultraviolet ray detection value according to the display position of the sun image, which overlaps the radial image.

Referring again to FIG. 8C, when the sun object 830 extends over the second circle 823 of the radial images 820, the electronic device 800 may determine that an angle between the ultraviolet ray detection sensor and the sun is about 20 degrees, and then perform a correction (or compensation) by multiplying the detected ultraviolet ray value by about 1.15 to correct for a reduced quantity of light (for example, about 15%) due to the corresponding angle (for example, about 20 degrees).

Referring again to FIG. 7, in step 760, the electronic device outputs the corrected ultraviolet ray value, for example, as illustrated in FIG. 8D, as described above.

Figure 9:
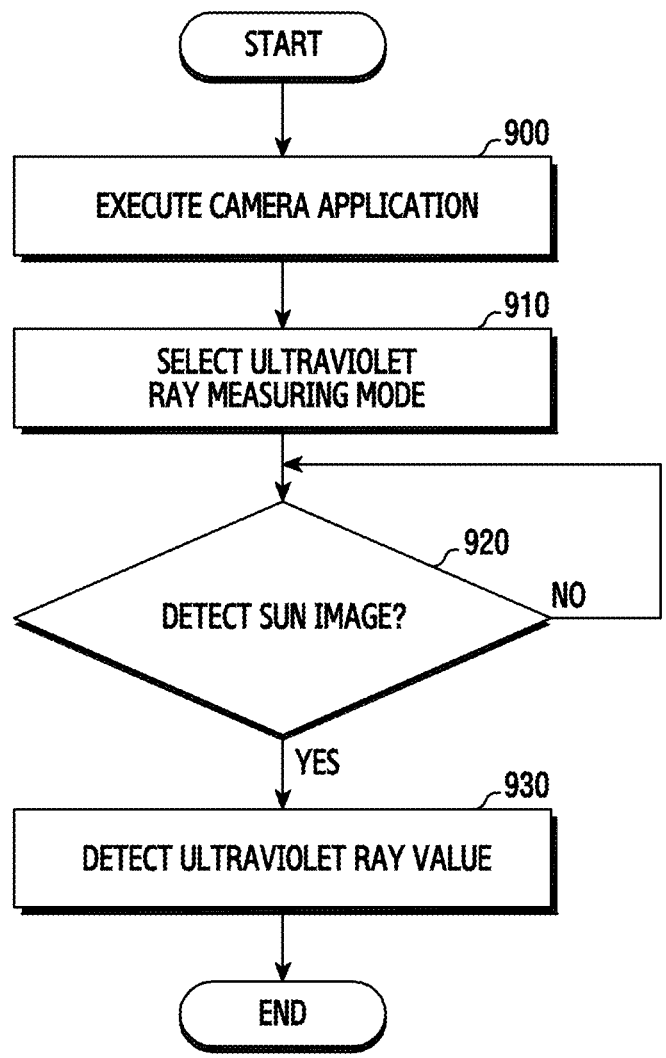
FIG. 9 is a flowchart illustrating an ultraviolet ray detection method according to an embodiment of the present invention.

FIG. 9 is a flowchart illustrating an ultraviolet ray detection method according to an embodiment of the present invention.

Referring to FIG. 9, an electronic device (for example, the electronic device 100) executes a camera application in operation 900. For example, a user may select a camera application loaded in the electronic device.

In step 910, the electronic device detects an ultraviolet ray measuring mode. For example, the electronic device enters the ultraviolet ray measuring mode for detecting an ultraviolet ray when the camera application is executed. The ultraviolet ray measuring mode may be a particular mode for photographing the sun and detecting an ultraviolet ray from the sun. As described above, the electronic device may photograph the sun through an image sensor installed in a front surface or a rear surface thereof.

Figure 10A:
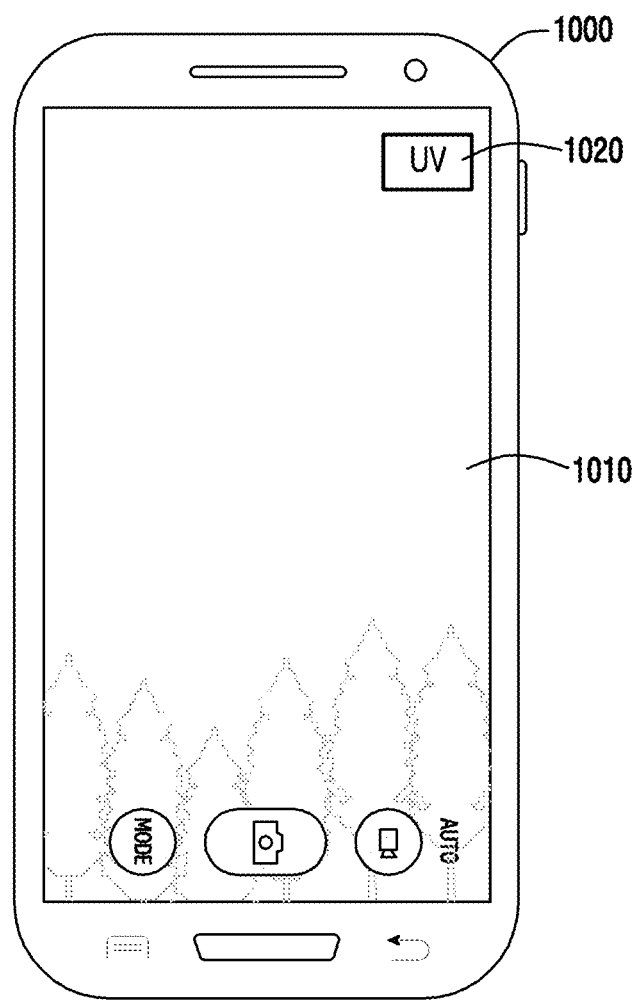
FIGS. 10A, 10B, and 10C illustrate screen configurations for detecting ultraviolet rays according to an embodiment of the present invention.
Figure 10B:
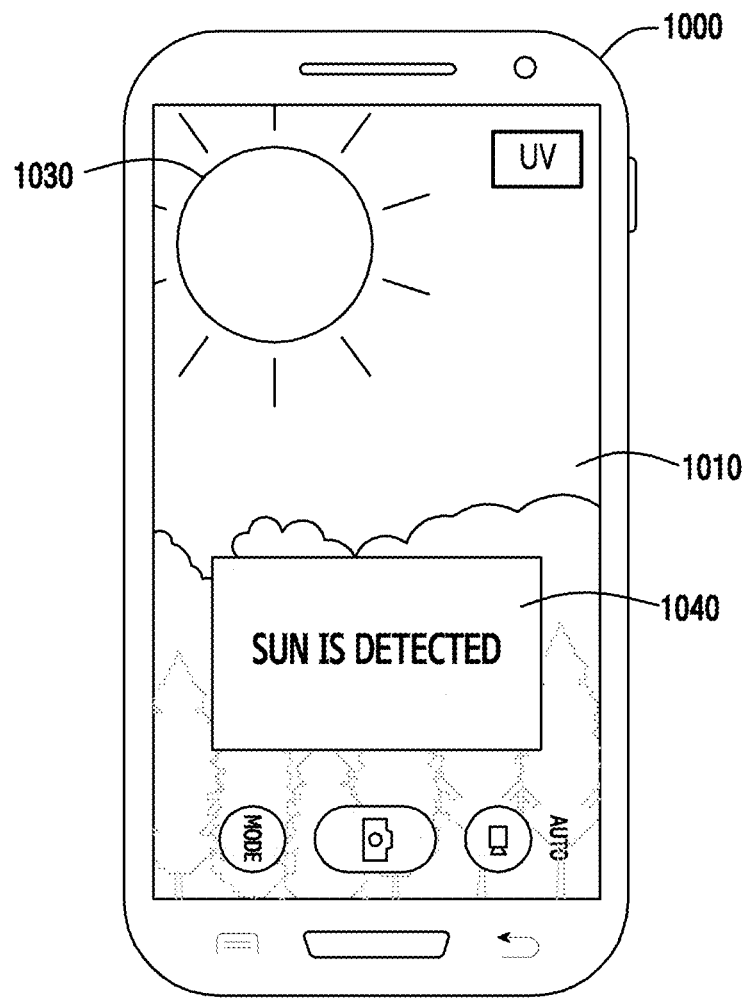
Figure 10C:
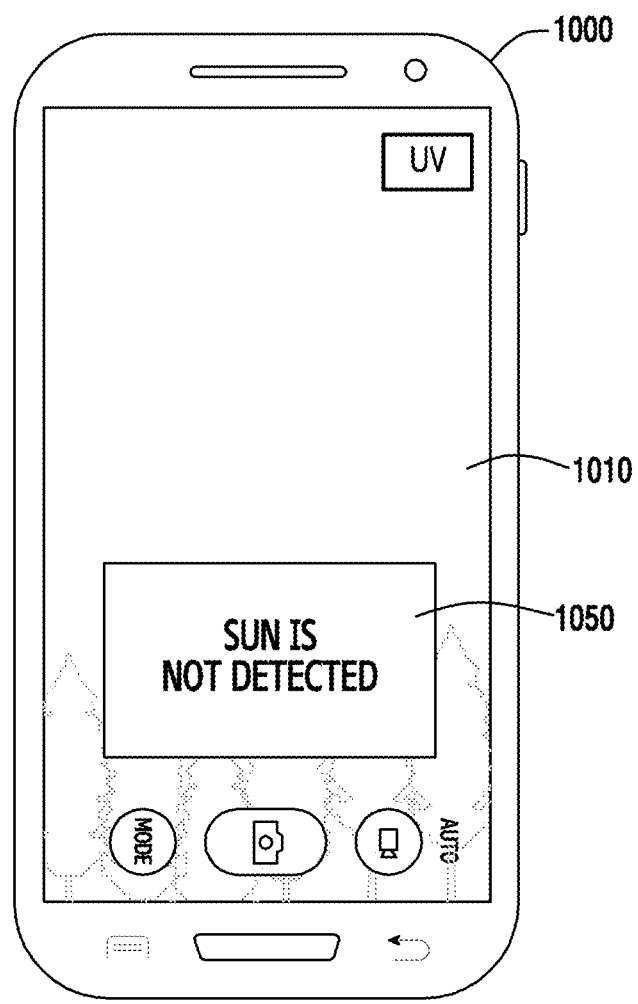

FIGS. 10A, 10B, and 10C illustrate screen configurations for detecting ultraviolet rays according to an embodiment of the present invention.

Referring to FIG. 10A, the electronic device 1000 enters the ultraviolet ray measuring mode for photographing the sun and detecting the ultraviolet ray. For example, the electronic device 1000 displays a preview screen 1010 showing an image photographed through an image sensor and displays a symbol 1020 indicating a photographing mode for ultraviolet ray measurement. The electronic device 1000 may set a resolution of the preview screen 1010 to be relatively low.

Referring again to FIG. 9, in step 920, the electronic device determines whether a sun image is detected. For example, the electronic device may identify whether the sun image is detected on the screen through the image sensor.

Referring to FIG. 10B, when the electronic device 1000 photographs the sun, the electronic device 1000 displays a sun object 1030 received through an image sensor on a preview screen 1010. The user may view the sun object 1030 through the preview screen 1010, and control a position of the sun object 1030 on the preview screen 1010 by changing a position of the electronic device 1000. The electronic device 1000 may display a notice 1040 indicating that the sun object 1030 is detected.

Referring again to FIG. 9, when the sun image is detected, the electronic device detects an ultraviolet ray value in step 930. For example, the electronic device may measure the ultraviolet ray value through an ultraviolet ray detection sensor installed in a front surface or a rear surface thereof, as described above.

When the sun is not detected in step 920, the electronic device may display an indication, e.g., as illustrated in display notice 1050 in FIG. 10C, until the sun is detected.

Figure 11:
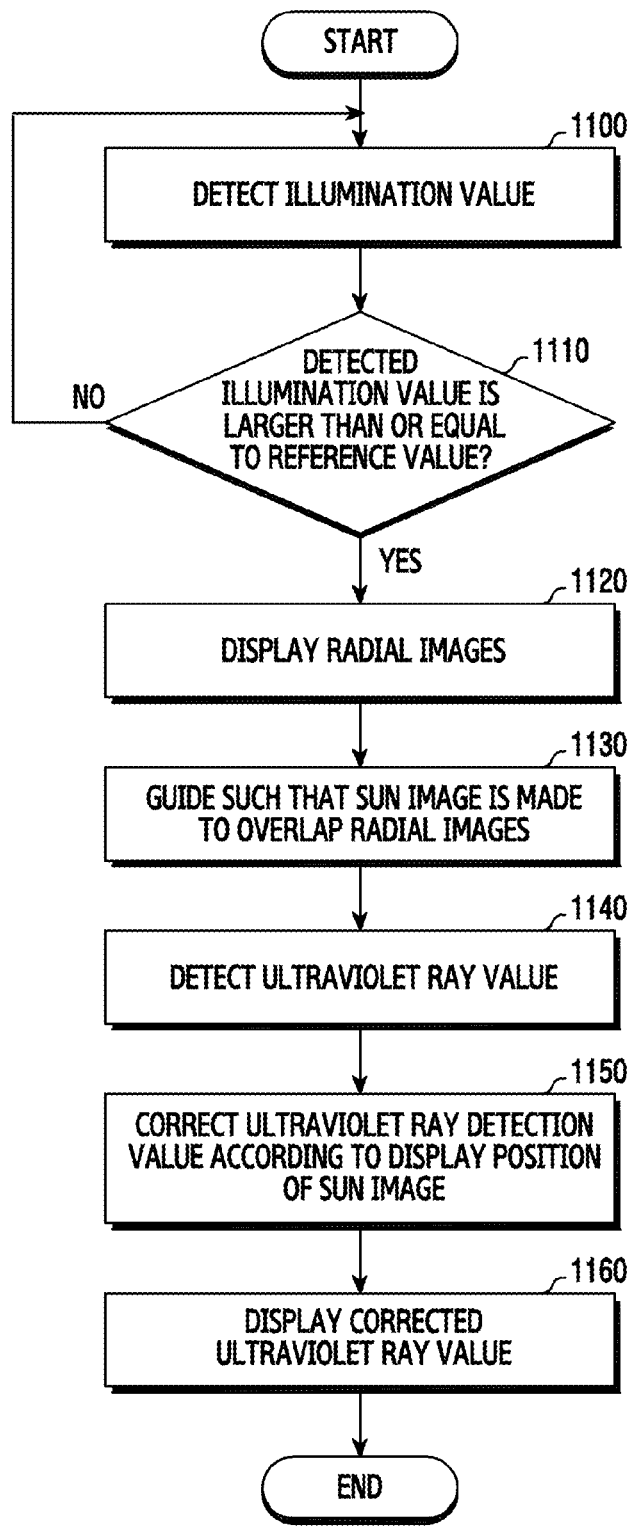
FIG. 11 is a flowchart illustrating an ultraviolet ray detection method according to an embodiment of the present invention.

FIG. 11 is a flowchart illustrating an ultraviolet ray detection method according to an embodiment of the present invention.

Referring to FIG. 11, an electronic device (for example, the electronic device 100) detects an illumination value (for example, lux) in step 1100. For example, the electronic device may measure a current illumination using an illumination sensor installed in a front surface or a rear surface thereof. The electronic device may measure illumination at a specific time, at different intervals, or in response to a user command. Further, the electronic device may measure illumination, when a preset condition is detected.

In step 1110, the electronic device determines whether the detected illumination value is larger than or equal to a reference value. For example, the electronic device may determine whether to enter an ultraviolet ray measuring mode based on the detected illumination value. The reference value may be a minimum brightness value for detecting an ultraviolet ray from the sun.

When the detected illumination value is smaller than the reference value, the method returns to step 1100 and the electronic device may detect an illumination value again.

When the detected illumination value is greater than or equal to the reference value, the electronic device displays guide object (or radial images) in step 1120. Specifically, when an illumination value greater than or equal to the reference value is detected, the electronic device may perform an ultraviolet ray measuring process, for example, as illustrated in FIG. 8A, as described above.

In step 1130, the electronic device guides the user to make the sun object overlap a guide object (e.g., the radial images). For example, the electronic device may guide the user to move the electronic device such that the sun object is arranged at the center of the radial images to detect an ultraviolet ray, as illustrated in FIG. 8C, as described above.

In step 1140, the electronic device detects an ultraviolet ray value. For example, the electronic device may measure the ultraviolet ray value using an ultraviolet ray detection sensor installed in a front surface or a rear surface thereof. In step 1150, the electronic device corrects the ultraviolet ray detection value based on a difference between a position of sun object and a position of the guide object. For example, the electronic device may correct the ultraviolet ray detection value according to the display position of the sun object, which overlaps the guide object.

Referring again to FIG. 8C, the electronic device 800 may determine that an angle between the ultraviolet ray detection sensor and the sun is about 20 degrees, and then perform a correction (or a compensation) by multiplying the detected ultraviolet ray value by about 1.15 to correct for a reduced quantity of light (for example, about 15%) due to the corresponding angle (for example, about 20 degrees).

In step 1160, the electronic device outputs the corrected ultraviolet ray value, for example, as illustrated in FIG. 8D, as described above.

Figure 12:
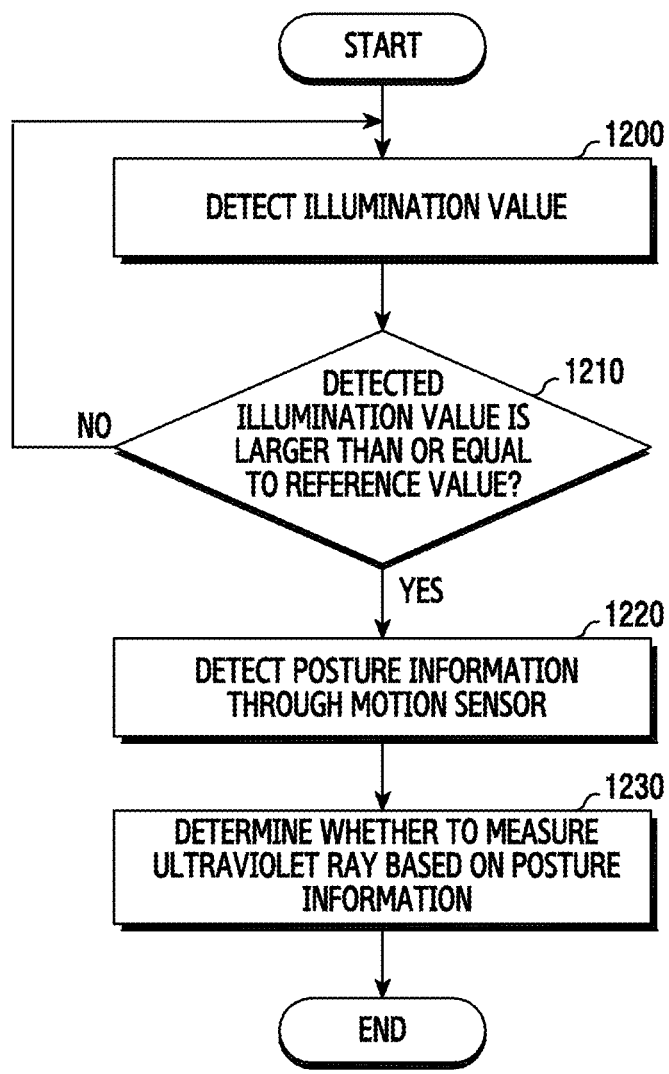
FIG. 12 is a flowchart illustrating an ultraviolet ray detection method according to an embodiment of the present invention.

FIG. 12 is a flowchart illustrating an ultraviolet ray detection method according to an embodiment of the present invention.

Referring to FIG. 12, the electronic device (for example, the electronic device 100) may detect an illumination value (for example, lux) in step 1200. For example, the electronic device measures current illumination through an illumination sensor installed in a front surface or a rear surface thereof. For example, the electronic device may measure illumination at a specific time, at different intervals, or in response to a user command. Further, the electronic device may measure illumination, when a preset condition is detected.

In step 1210, the electronic device determines whether the detected illumination value is greater than or equal to a reference value. For example, the electronic device may determine whether to enter an ultraviolet ray measuring mode based on the detected illumination value. The reference value may be a minimum brightness value for detecting an ultraviolet ray from the sun.

When the detected illumination value is smaller than the reference value, the method returns to step 1200 and the electronic device may detect an illumination value again.

When the detected illumination value is greater than or equal to the reference value, the electronic device may detect position information through a motion sensor in step 1220. For example, the position information may include a motion direction, a motion angle, a motion speed, or a held state of the electronic device. The electronic device may identify a position of the electronic device, which the user holds, through the motion sensor. For example, the electronic device may determine whether the user is holding the electronic device to face the floor or the sky.

In step 1230, the electronic device determines whether to measure an ultraviolet ray based on the detected position information. For example, when it is determined that the user is holding the electronic device to face the sky based on an analysis result of the detected position information, the electronic device may perform an ultraviolet ray measuring process. For example, when it is determined that the user is holding the electronic device to face the sky, the electronic device may automatically drive an ultraviolet ray measuring mode or request if the user would like to enter the ultraviolet ray measuring mode. The electronic device may measure an ultraviolet ray in real time, when the sun is detected through the image sensor.

Figure 13:
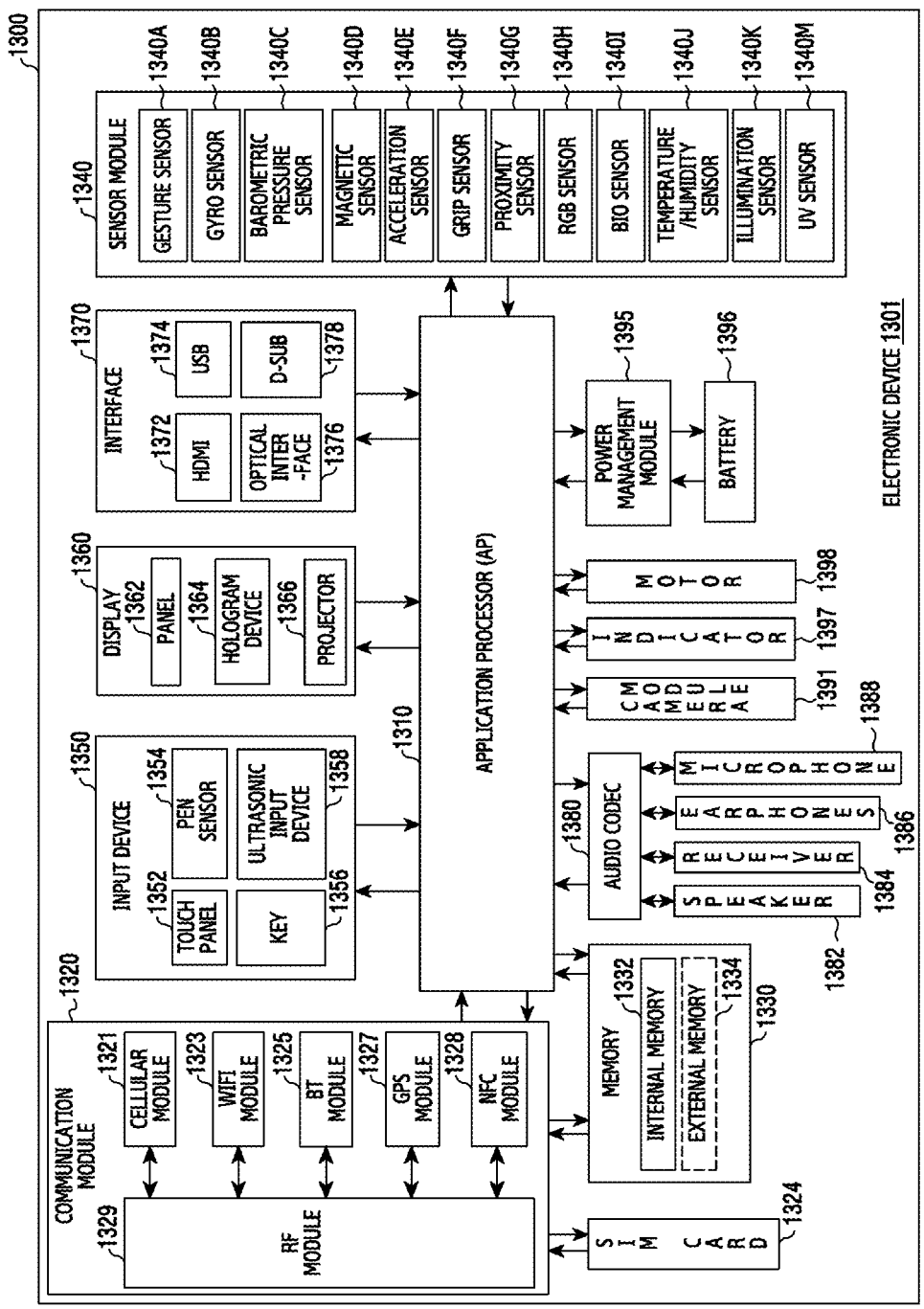
FIG. 13 illustrates an electronic device according to an embodiment of the present invention.

FIG. 13 illustrates an electronic device according to an embodiment of the present invention. The electronic device 1301 may configure, for example, all or a portion of the electronic device 100 illustrated in FIG. 1.

Referring to FIG. 13, the electronic device 1301 includes an Application Processor (AP) 1310, a communication module 1320, a Subscriber Identification Module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control a plurality of hardware or software components connected to the AP 1310 by driving an operating system or an application program and perform processing of various pieces of data including multimedia data and calculations. The AP 1310 may, for example, be implemented by a system on chip (SoC). The AP 1310 may further include a Graphic Processing Unit (GPU).

The communication module 1320 may transmit and receive data in communication between the electronic device 1301 and other electronic devices connected thereto through a network. The communication module 1320 includes a cellular module 1321, a Wi-Fi module 1323, a BT module 1325, a GPS module 1327, an NFC module 1328, and a Radio Frequency (RF) module 1329.

The cellular module 1321 may provide a voice call, a video call, a text message service, or an Internet service through a communication network (for example, LTE, LTE-A, CDMA, WCDMA, UMTS, WiBro, or GSM). Further, the cellular module 1321 may perform identification and authentication of electronic devices in a communication network using, for example, a subscriber identification module (for example, the SIM card 1324). The cellular module 1321 may perform at least some functions which the AP 1310 may provide. For example, the cellular module 1321 may perform at least some of the multimedia control functions.

The cellular module 1321 may include a Communication Processor (CP). Further, the cellular module 1321 may be implemented by, for example, an SoC. Although the components such as the cellular module 1321 (for example, a communication processor), the memory 1330, and the power management module 1395 are illustrated as components separate from the AP 13410 in FIG. 13, the AP 1310 may include at least some of the aforementioned components (for example, the cellular module 1321) according to one embodiment.

The AP 1310 or the cellular module 1321 (for example, the communication processor) may load a command or data received from at least one of a non-volatile memory and other components connected thereto in a volatile memory, and may process the loaded command or data. Furthermore, the AP 1310 or the cellular module 1321 may store data received from or generated by at least one of other elements in a non-volatile memory.

Each of the Wi-Fi module 1323, the BT module 1325, the GPS module 1327, and the NFC module 1328 may include, for example, a processor for processing data transmitted/received through the corresponding module. Although the cellular module 1321, the Wi-Fi module 1323, the BT module 1325, the GPS module 1327, and the NFC module 1328 are illustrated as separate blocks in FIG. 13, at least some (for example, two or more) of the cellular module 1321, the Wi-Fi module 1323, the BT module 1325, the GPS module 1327, and the NFC module 1328 may be included in one Integrated Chip (IC) or one IC package in one embodiment. For example, at least some (for example, the communication processor corresponding to the cellular module 1321 and the Wi-Fi processor corresponding to the Wi-Fi module 1323) of the processors corresponding to the cellular module 1321, the Wi-Fi module 13235, the BT module 13257, the GPS module 13278, and the NFC module 13228 may be implemented as one SoC.

The RF module 1329 may transmit/receive data, for example, an RF signal. The RF module 1329 may include, for example, a transceiver, a Power Amp Module (PAM), a frequency filter, a Low Noise Amplifier (LNA), etc. Further, the RF module 1329 may include a component for transmitting/receiving electronic waves over a free air space in wireless communication, such as a conductor, a conducting wire, etc.

Although the cellular module 1321, the Wi-Fi module 1323, the BT module 1325, the GPS module 1327, and the NFC module 1328 share one RF module 1329 in FIG. 13, at least one of the cellular module 1321, the Wi-Fi module 1323, the BT module 1325, the GPS module 1327, or and the NFC module 1328 may transmit/receive an RF signal through a separate RF module in one embodiment.

The SIM card 1324 may be inserted into a slot formed in a particular portion of the electronic device. The SIM card 1324 may include unique identification information (for example, an Integrated Circuit Card IDentifier (ICCID)) or subscriber information (for example, an International Mobile Subscriber Identity (IMSI)).

The memory 1330 includes an internal memory 1332 or an external memory 1334. The internal memory 1332 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.).

The internal memory 1332 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an extreme Digital (xD), a memory stick, etc. The external memory 1334 may be functionally connected with the electronic device 1301 through various interfaces. According to an embodiment, the electronic device 1301 may further include a storage device (or a storage medium) such as a hard disc drive.

The sensor module 1340 may measure a physical quantity or detect an operation state of the electronic device 1301, and may convert the measured or detected information to an electrical signal. The sensor module 1340 includes a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, a Red/Green/Blue (RGB) sensor), a biometric sensor 1340I, a temperature/humidity sensor 1340J, an illumination sensor 1340K, and an Ultra Violet (UV) sensor 1340M. The sensor module 1340 may also include at least one of an E-nose sensor, an electromyography (EMG) sensor, an electroencephalogram (EEG) sensor, an electrocardiogram (ECG) sensor, an Infrared (IR) sensor, an iris sensor, and a fingerprint sensor. The sensor module 1340 may further include a control circuit for controlling one or more sensors included in the sensor module.

The input device 1350 may include a touch panel 1352, a (digital) pen sensor 1354, a key 1356, or an ultrasonic input device 1358. The touch panel 1352 may recognize a touch input through at least one of a capacitive type, a resistive type, an infrared type, and an ultrasonic type. The touch panel 1352 may further include a control circuit. A capacitive touch panel may recognize a physical contact or proximity. The touch panel 1352 may further include a tactile layer. In this case, the touch panel 1352 may provide a tactile reaction to the user.

The (digital) pen sensor 1354 may be implemented, for example, using the same or similar method to receiving a user's touch input or using a separate recognition sheet. The key 1356 may include, for example, a physical button, an optical key, or a keypad. The ultrasonic input device 1358 may identify data by detecting an acoustic wave with a microphone (for example, a microphone 1388) of the electronic device 1301 through an input unit generating an ultrasonic signal, and may perform wireless recognition. The electronic device 1301 may receive a user input from an external device (for example, a computer or server) connected thereto using the communication module 1320.

The display 1360 may include a panel 1362, a hologram device 1364 or a projector 1366. The panel 1362 may be, for example, a Liquid Crystal Display (LCD), Active-Matrix Organic Light Emitting Diode (AM-OLED), etc. The panel 1362 may be implemented to be, for example, flexible, transparent, or wearable. The panel 1362 may be configured as one module together with the touch panel 1352. The hologram device 1364 may show a stereoscopic image in the air by using interference of light. The projector 1366 may project light onto a screen to display an image. The screen may be located, for example, inside or outside the electronic device 1301. The display 1360 may further include a control circuit for controlling the panel 1362, the hologram device 1364, or the projector 1366.

The interface 1370 includes, for example, a High-Definition Multimedia Interface (HDMI) 1372, a Universal Serial Bus (USB) 1374, an optical interface 1376, and a D-subminiature (D-sub) 1378. The interface 1370 may include, for example, a Mobile High-definition Link (MHL) interface, a Secure Digital (SD) card/Multi-Media Card (MMC) interface, or an Infrared Data Association (IrDA) standard interface.

The audio module 1380 may bilaterally convert a sound and an electrical signal. The audio module 1380 may process sound information input or output through a speaker 1382, a receiver 1384, earphones 1386, the microphone 1388, etc.

The camera module 1391 is a device for capturing a still image or a video, and may include one or more image sensors (for example, a front sensor or a rear sensor), a lens, an Image Signal Processor (ISP), or a flash (for example, an LED or xenon lamp).

The power management module 1395 manages power of the electronic device 1301. The power management module 1395 may include, for example, a Power Management Integrated Circuit (PMIC), a charger Integrated Circuit (IC), or a battery gauge. The PMIC may be mounted to, for example, an integrated circuit or an SoC semiconductor.

Charging methods may be classified into a wired charging method and a wireless charging method. The charger IC may charge a battery and prevent over voltage or over current from a charger. The charger IC may include a charger IC for at least one of the wired charging method or and the wireless charging method. Examples of the wireless charging may include magnetic resonance charging, magnetic induction charging, and electromagnetic charging, and an additional circuit such as a coil loop, a resonance circuit, and a rectifier may be added for the wireless charging.

The battery gauge measures, for example, a remaining quantity of the battery 1396, or a voltage, a current, or a temperature during the charging. The battery 1396 may store or generate electricity, and may supply power to the electronic device 1301 using the stored or generated electricity. The battery 1396 may include a rechargeable battery or a solar battery.

The indicator 1397 may display a specific status of the electronic device 1301 or the part (for example, the AP 1310) of electronic device 1301, for example, a booting status, a message status, a charging status, etc. The motor 1398 may convert an electrical signal to a mechanical vibration. The electronic device 1301 may include a processing unit (for example, a GPU) for supporting mobile TV. The processing unit for supporting mobile TV may process media data according to a standard of Digital Multimedia Broadcasting (DMB), Digital Video Broadcasting (DVB), media flow, etc.

An ultraviolet ray detection method and an electronic device thereof according to an embodiment of the present invention, as described above, can improve the accuracy of an ultraviolet ray detection value by matching an incident angle of the sun and a viewing angle of an ultraviolet ray detection sensor.

An ultraviolet ray detection method and an electronic device thereof according to an embodiment of the present invention, as described above, allows a user to more conveniently measure an ultraviolet ray by displaying radial images on a display screen and guiding the user to move the electronic device such that a photographed sun image is made to overlap the radial images.

An ultraviolet ray detection method and an electronic device thereof according to an embodiment of the present invention, as described above, can sense an ultraviolet ray in a relatively short period of time, thereby reducing the ultraviolet ray measurement time by quickly aiming the electronic device toward the sun in an accurate direction to measure the ultraviolet rays while viewing the sun on the screen.

The above-described components of an electronic device according to the various embodiments of the present invention may be formed of one or more components, and a name of a corresponding component element may be changed based on the type of electronic device. The electronic device may include one or more of the aforementioned components or may further include other additional components, or some of the aforementioned components may be omitted. Further, some of the components of the electronic may be combined to form a single entity, and thus, may equivalently execute functions of the corresponding elements prior to the combination.

According to various embodiments, at least some of the devices (for example, modules or functions thereof) or the methods (for example, operations), as described above, may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least a part of the programming module may, for example, be implemented (e.g., executed) by the processor 120. At least some of the programming modules may include, for example, a module, a program, a routine, a set of instructions, or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, etc. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of operating an electronic device, the method comprising:
   detecting an ultraviolet ray value through an ultraviolet ray detection sensor; acquiring an image including a sun object;
   comparing a position of the sun object within the acquired image to a position of a guide object applied to the acquired image; and
   correcting the detected ultraviolet ray value based on a difference between the position of the sun object and the position of the guide object, wherein correcting the detected ultraviolet ray value based on the difference between the position of the sun object and the position of the guide object comprises applying an ultraviolet ray correction value according to the difference between the position of the sun object and the position of the guide object to the detected ultraviolet ray value.

2. The method of claim 1, wherein the guide object visually indicates a direction in which the ultraviolet ray detection sensor faces.

3. The method of claim 1, wherein the guide object includes a plurality of circles having different sizes and a common center.

4. The method of claim 1, wherein the ultraviolet ray value is detected based on a measured illumination value.

5. The method of claim 1, wherein comparing the position of the sun object within the acquired image to the position of the guide object comprises guiding a user to move the electronic device such that the sun object overlaps the guide object.

6. An electronic device comprising:
an ultraviolet ray detection sensor configured to detect an ultraviolet ray value;
an image sensor configured to acquire an image including a sun object;
a display configured to display the image including the sun object; and a processor configured to compare a position of the sun object within the acquired image to a position of a preset guide object applied to the acquired image, and
correct the detected ultraviolet ray value based on a difference between the position of the sun object and the position of the guide object,
wherein the processor corrects the detected ultraviolet ray value by applying an ultraviolet ray correction value according to the difference between the position of the sun object and the position of the guide object to the detected ultraviolet ray value.

7. The electronic device of claim 6, wherein the guide object visually indicates a direction in which the ultraviolet ray detection sensor faces.

8. The electronic device of claim 6, wherein the guide object includes a plurality of circles having different sizes and a common center.

9. The electronic device of claim 6, wherein the ultraviolet ray detection sensor detects the ultraviolet ray value based on a measured illumination value.

10. The electronic device of claim 6, wherein the processor guides a user to move the electronic device such that the sun object overlaps the guide object.

11. A method of operating an electronic device, the method comprising:
displaying a first object on a display;
capturing a sun object;
overlapping the sun object with the first object; and
detecting an ultraviolet ray value through an ultraviolet ray detection sensor based on a difference between a position of the first object and a position of the sun object, wherein detecting the ultraviolet ray value comprises applying an ultraviolet ray correction value according to the difference between the position of the sun object and the position of the guide object to an initially detected ultraviolet ray value.

12. The method of claim 11, wherein the first object includes a guide object.

13. The method of claim 11, wherein the first object visually indicates a direction in which the ultraviolet ray detection sensor faces.

14. The method of claim 13, wherein overlapping the sun object with the first object comprises guiding a user to move the electronic device such that the sun object overlaps the first object.

* * * * *